United States Patent
Natali et al.

(10) Patent No.: US 6,317,412 B1
(45) Date of Patent: Nov. 13, 2001

(54) INCREASED CAPACITY IN AN OCDMA SYSTEM FOR FREQUENCY ISOLATION

(75) Inventors: Francis D. Natali, Townsend, WA (US); John Ohlson, Mt. View, CA (US)

(73) Assignee: Stanford Telecommunications, Inc., Sunnyvale, CA (US)

(*) Notice: Subject to any disclaimer, the term of this patent is extended or adjusted under 35 U.S.C. 154(b) by 0 days.

(21) Appl. No.: 08/989,466

(22) Filed: Dec. 12, 1997

(51) Int. Cl.[7] ................................................. H04B 7/216
(52) U.S. Cl. .......................... 370/208; 370/335; 370/441; 455/447
(58) Field of Search .......................... 370/208, 209, 370/328, 329, 330, 335, 341, 342, 441, 478, 479; 455/446, 447, 450, 454

(56) References Cited

U.S. PATENT DOCUMENTS

| | | | |
|---|---|---|---|
| 5,309,474 | * 5/1994 | Gilhousen et al. | 370/335 |
| 5,448,621 | * 9/1995 | Knudsen | 370/330 |
| 5,491,837 | * 2/1996 | Haartsen | 455/62 |
| 5,758,090 | * 5/1998 | Doner | 370/342 |
| 5,764,630 | * 6/1998 | Natali et al. | 370/320 |
| 5,982,758 | * 11/1999 | Hamdy | 370/331 |
| 6,049,538 | * 4/2000 | Scott | 370/347 |

* cited by examiner

*Primary Examiner*—Ricky Ngo
(74) *Attorney, Agent, or Firm*—Jim Zegeer

(57) ABSTRACT

A spread spectrum OCDMA communication system in which multiple base stations or beams from a satellite are deployed in a "cellular" coverage structure, system capacity is increased by dividing the available spectrum into non-overlapping frequency segments which are assigned to different cells in a frequency reuse pattern to provide greater system capacity than full frequency reuse in each cell.

7 Claims, 6 Drawing Sheets

INCREASED CAPACITY IN AN OCDMA SYSTEM FOR FREQUENCY ISOLATION

BACKGROUND AND BRIEF DESCRIPTION OF PRIOR ART

Spread spectrum (SS) communication is presently being used for a number of commercial applications and is expected to proliferate as the demand for untethered communications increases.

An article of A. J. Viterbi titled "When not to spread spectrum-a sequel", which appeared in *IEEE Commun. Mag.*, April 1985, showed Code Division Multiple Access (CDMA) to be inferior in multiple access capability to orthogonal systems such as FDMA and TDMA for a single coverage area. However, in 1990, Gilhousen et al published the paper "Increased Capacity Using CDMA for Mobile Satellite Communication" (*IEEE Journal on Selected Areas in Communications*, May 1990) which showed that system capacity is increased in a multibeam satellite system by using CDMA with a frequency reuse factor of one (i.e. the total frequency band is reused in each beam) compared to orthogonal systems which would typically employ a frequency reuse of 1:3 or 1:5, depending on the amount of isolation between beams.

In the paper "On the Capacity of a Cellular CDMA System" (*IEEE Trans. on Vehicular Technology*, May 1991) the capacity advantage of CDMA over orthogonal systems is further investigated for the case of cellular telephone systems. In this cases, the 1:1 frequency reuse of CDMA compares very favorably with the typical 1:7 reuse pattern for analog systems.

The use of "marginal isolation" to provide full frequency reuse in quasi-orthogonal (nonsynchronous) CDMA systems is disclosed in U.S. Pat. No. 4,901,307 to Gilhousen, Jacobs and Weaver, for example.

One example of commercial application of SS is the IS-95 standard for cellular telephones. This system uses Orthogonal CDMA (OCDMA) on the forward (cell-to-mobile) links and nonsynchronous CDMA on the return links. Full frequency reuse is employed in each cell on both forward and return links. Also see U.S. Pat. No. 5,103,459 to Gilhousen et al.

The basic signal format for OCDMA was disclosed by M. J. E. Golay in IDA Report 108, page 110 (1965). The system described by Golay is orthogonal in both the forward and return link directions. One example of an OCDMA system is disclosed in U.S. Pat. No. 5,375,140 assigned to the assignee of the present invention and titled "Wireless Direct Sequence Spread Spectrum Digital Cellular Telephone System" and incorporated herein by reference.

A number of consortiums have been formed to develop satellite based Personal Communications Systems (PCS) with global coverage. These systems include Globalstar (Globalstar System Application before the FCC by Loral Cellular Systems Corp., Jun. 3, 1991), Odyssey (Application of TRW Inc. before the FCC to Construct a New Communications Satellite System "Odyssey," May 31, 1991), Ellipso (filed November, 1990), and ECCO (filed by Constellation Communications Inc. in June, 1991), among others.

The intent of these systems is that a subscriber can place telephone calls directly through the satellite network from almost anywhere on the Earth, using a portable handset much like the present cellular telephones. All of the systems mentioned are required to use spread spectrum CDMA techniques for bandsharing purposes.

The Globalstar application discloses a signal which is essentially the same as the IS-95 standard and the entire frequency band is reused in every beam on both the forward and return links. The other applications, although not so detailed, assume similar waveforms and full frequency reuse.

The forward link of IS-95 differs from the return link in that it uses synchronous orthogonal OCDMA. However, no distinction is made in frequency reuse, and it is assumed that full frequency reuse is the best choice.

OBJECTS OF THE INVENTION

The object of this invention is to increase the capacity of a synchronous OCDMA system under certain conditions by employing a frequency reuse factor other than one and taking advantage of the orthogonal properties of the multiple access codes within a beam (or cell) and the quasi-orthogonal properties between beams (or cells).

SUMMARY OF THE INVENTION

Each user within a beam of a multibeam OCDMA satellite system is assigned one code of an orthogonal code set. This code is overlaid with a longer PN code which is common to all the users within a beam. Different beams may use different PN codes, or a time shifted version of the same code, to provide quasi-orthogonality between beams. This allows the same orthogonal code set to be reused in each beam. In order to maintain orthogonality, the orthogonal signals must arrive at receiver in time synchronism. On the forward link, where all signals originate at the same base station, synchronism is trivial. However, on the return link (subscriber-to-base station), some means must be provided to synchronize the subscriber terminal transmissions so they arrive in time synchronism at the base station. Thus, users within a beam are orthogonal and the same-beam access noise of a quasi-orthogonal CDMA system is avoided. However, other-beam users are quasi-orthogonal and generate access noise as in a typical CDMA system.

OCDMA has the advantage over CDMA that the in-beam access noise is eliminated thus potentially giving higher capacity for the same received power. Further, it has the advantage over other orthogonal-but non-spread-systems of being quasi-orthogonal between beams, thus allowing a lower frequency reuse factor.

The above comments apply to terrestrial cellular system as well as multi-beam satellite systems.

In OCDMA systems disclosed to date, it has been assumed that full frequency reuse gives the highest capacity. However, this patent discloses that higher capacity can be achieved, under some conditions, by employing a frequency reuse factor other than one (i.e. splitting the band between beams).

BRIEF DESCRIPTION OF SEVERAL VIEWS OF THE DRAWINGS

The above and other objects, advantages and features of the invention will become more clear when considered with the following description and accompanying drawings wherein.

$U_r=1$, $f_1=2.0$, $R_1=0.5$, $C_c(1)=17$, $(E_b/N_o)_{Req'd}=3$ dB, $G_v(1-\eta)F=1$, and $U_r=3$, $f_3=0.032$, $R_3=0.75$, $C_c(3)=5$, $(E_b/N_o)_{Req'd}=4.5$ dB, $G_v(1-\eta)F=1$, respectively.

$U_r=1$, $f_1=1.0$, $R_1=0.5$, $C_c(1)=17$, $(E_b/N_o)_{Req'd}=3$ dB, $G_v(1-\eta)F=1$, and $U_r=3$, $f_3=0.032$, $R_3=0.75$, $C_c(3)=5$, $(E_b/N_o)_{Req'd}=4.5$ dB, $G_v(1-\eta)F=1$, respectively.

DETAILED DESCRIPTION OF THE INVENTION

A general approximate formula for capacity in terms of the number of CDMA users supportable per call or beam (in the reverse direction) is given by Viterbi ("The Orthogonal-Random Waveform Dichotomy for Digital Mobile Personal Communication," *IEEE Personal Communications*, first Quarter, 1994) as $$N_u(CDMA) = \frac{(W/R)G_v}{(E_b/N_o)_{Req'd}(1+f)}[(1-\eta)F] \quad (1)$$

where:

W=spread spectrum bandwidth

R=data rate $E_b/N_o)_{Req'd}$=required bit energy to interference density (including other user and thermal noise)

f=ratio of total average other-cell-user interference to average same-beam-other-user interference $G_v$=voice (or data) activity gain $[(1-\eta)F]$ is a reduction due to power control limits and variability and traffic intensity statistical variation.

A more exact form of Eq. (1) is:

$$N_u(CDMA) = \frac{(W/R)G_v}{(1+f)}[(1-\eta)F]\left[\frac{1}{(E_b/N_o)_{Req'd}} - \frac{1}{(E_b/N_o)}\right] \quad (2)$$

where $E_b/N_o$ is the received bit energy to thermal noise density ratio.

Figure 3:
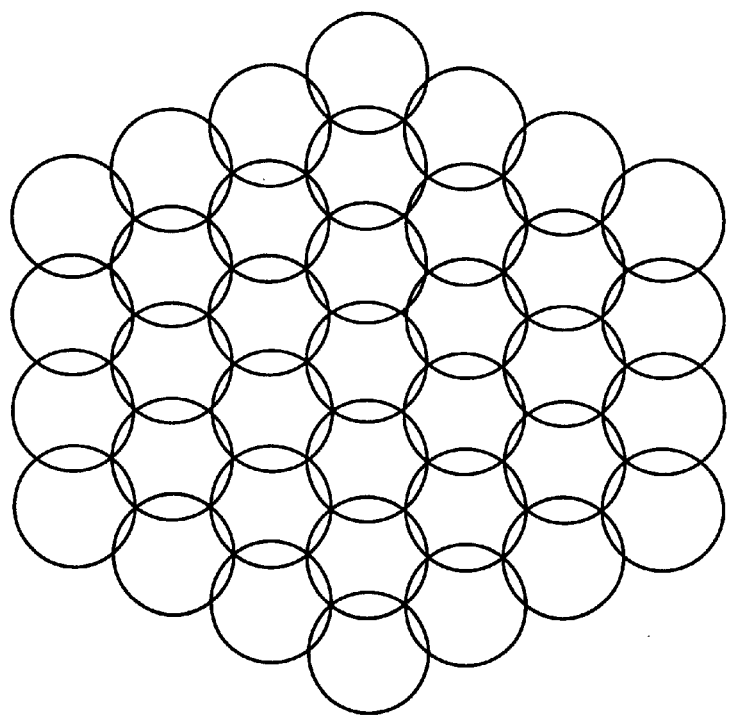
FIG. 3 is a typical satellite multi-beam antenna pattern.

For the terrestrial case, Viterbi et al argue that an upper bound on the ratio of total average other-cell-user interference to average same-beam-other-user interference is f=0.55. The satellite case is generally quite different. A typical satellite multibeam antenna pattern is shown in FIG. 3. In this case, the triple inter-section of beams is usually designed to be 3 or 4 dB below peak gain. The value of f is then generally between 1 and 2 for an interior beam and full frequency reuse.

The OCDMA system is somewhat different from the quasi-orthogonal CDMA system such as represented by IS-95 return link. In the OCDMA system, the maximum number of users in a beam is limited by the number of orthogonal functions available, which is equal to the ratio of the chipping rate to the symbol rate. This means that using OCDMA with QPSK data modulation is twice as bandwidth efficient as the same spread signal with BPSK data modulation (see U.S. Pat. No. 5,668,795, "Modulation System for Spread Spectrum CDMA Communication," Magill et al). Additional bandwidth efficiency can be achieved by employing orthogonal carrier spacing (see U.S. Pat. No. 5,623,487, "Doubly Orthogonal Code and Frequency Division Multiple Access Communication System", Natali). For this type of OCDMA system, the maximum number of users in a beam is given by:

$$N_{umax}(OCDMA) = \frac{2C_cR_cR}{R_b} \quad (3)$$

where $C_c$=number of carriers employed $R_c$=chipping rate

R=FEC code rate, and the spread bandwidth is $$W=(C_c=1)R_c \quad (4)$$

This capacity can be reached in each beam only if the system is not access noise limited. Typically, users in a beam share a long PN code which is mod-2 added to the orthogonal user codes. Adjacent beams use different "beam isolation" codes, or time shifted versions of the same code. This results in adjacent beams being quasi-orthogonal just as in a standard CDMA system even though the full set of orthogonal functions is employed in every beam. In this case, the access noise limited capacity of the OCDMA beam can be computed using Eq. (2) but with the term representing interference from other users in the same beam set to zero. This gives:

$$N_u(CDMA) = \frac{(W/R)G_v}{f}[(1-\eta)F]\left[\frac{1}{(E_b/N_o)_{Req'd}} - \frac{1}{(E_b/N_o)}\right] \quad (5)$$

The beam capacity is then computed as the smaller of Eq. (3) or Eq. (5).

As mentioned above, previously disclosed CDMA and OCDMA systems utilize the full frequency band in each beam. This is different from FDMA and TDMA systems which are not able to reuse the same frequencies in adjacent beams (or cells) since they do not have adequate isolation. This invention teaches how OCDMA systems which are orthogonal within a beam and quasi-orthogonal between beams can, over a wide range of conditions, achieve greater capacity by employing frequency isolation between beams rather than reusing the whole available band, even though it is not necessary for operation.

Figure 2:
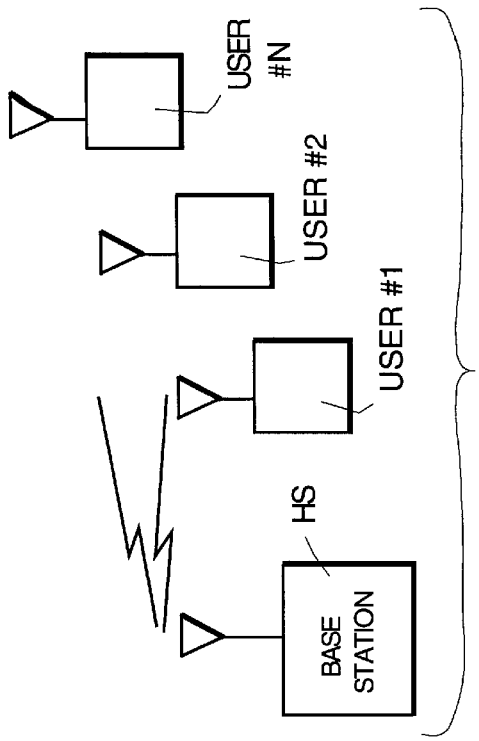
FIG. 2 is a block diagram of a terrestrially based OCDMA communication system incorporating the invention.
Figure 1:
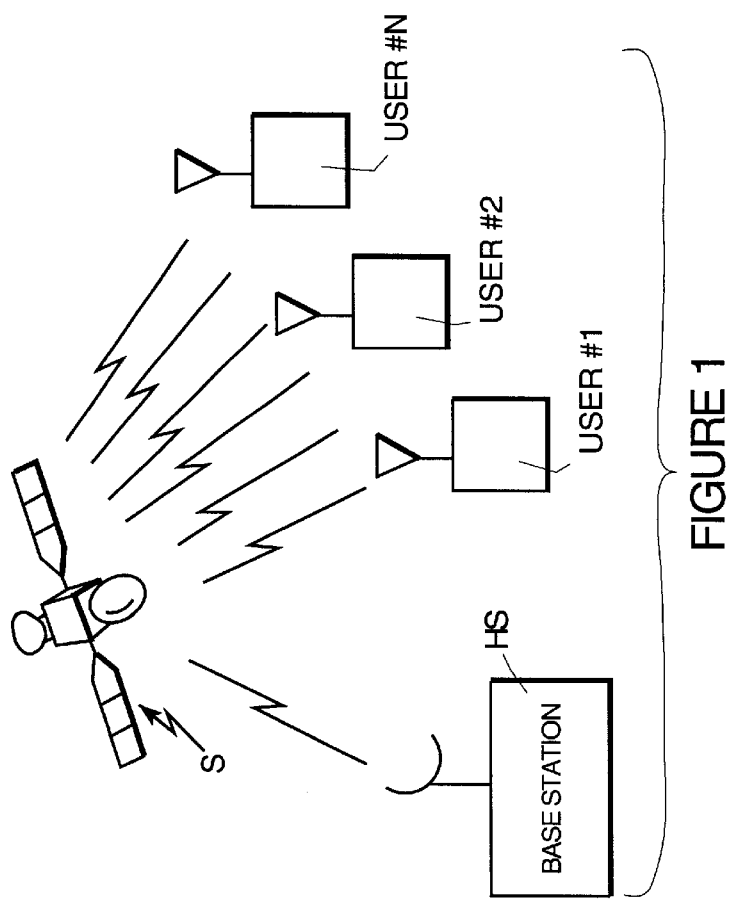
FIG. 1 is a block diagram of a satellite based OCDMA communication system incorporating the invention.
Figure 4:
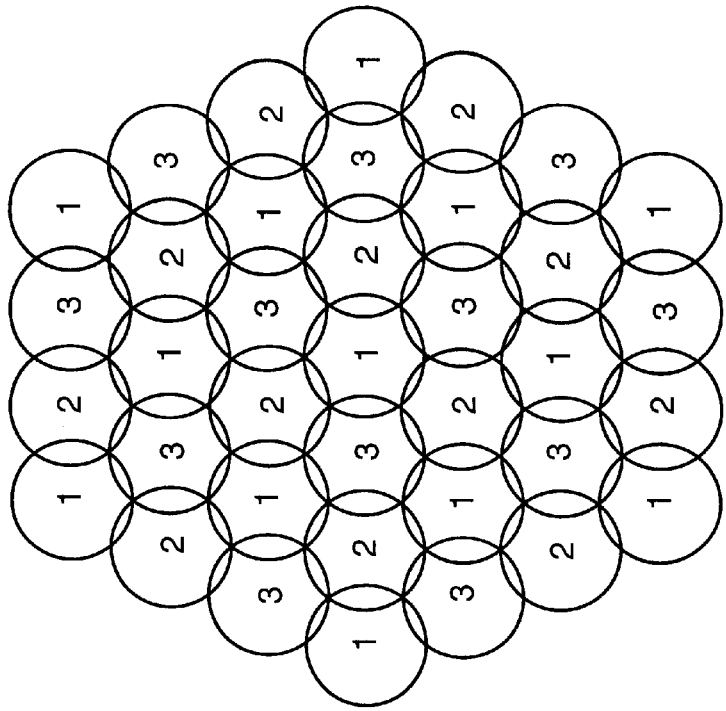
FIG. 4 is a typical satellite multi-beam antenna pattern with band segments assigned in a 1:3 frequency reuse pattern.

In order to employ frequency isolation, the available bandwidth is "split" into $U_r$ nonoverlapping segments, i.e. $W_{Avail}=W \times U_r$. Each band segment is assigned to a beam in a frequency reuse pattern. A typical example for 1:3 frequency reuse is shown in FIG. 4.

The normalized beam capacity computed using Eq. (5) is shown versus $E_b/N_o$ in FIGS. 4 and 5 for 1:1 and 1:3 frequency reuse and typical values of f. Note that using only ⅓ of the band in each beam (1:3 frequency reuse) gives greater capacity than full frequency reuse (1:1) over a wide range of $E_b/N_o$.

Figure 5:
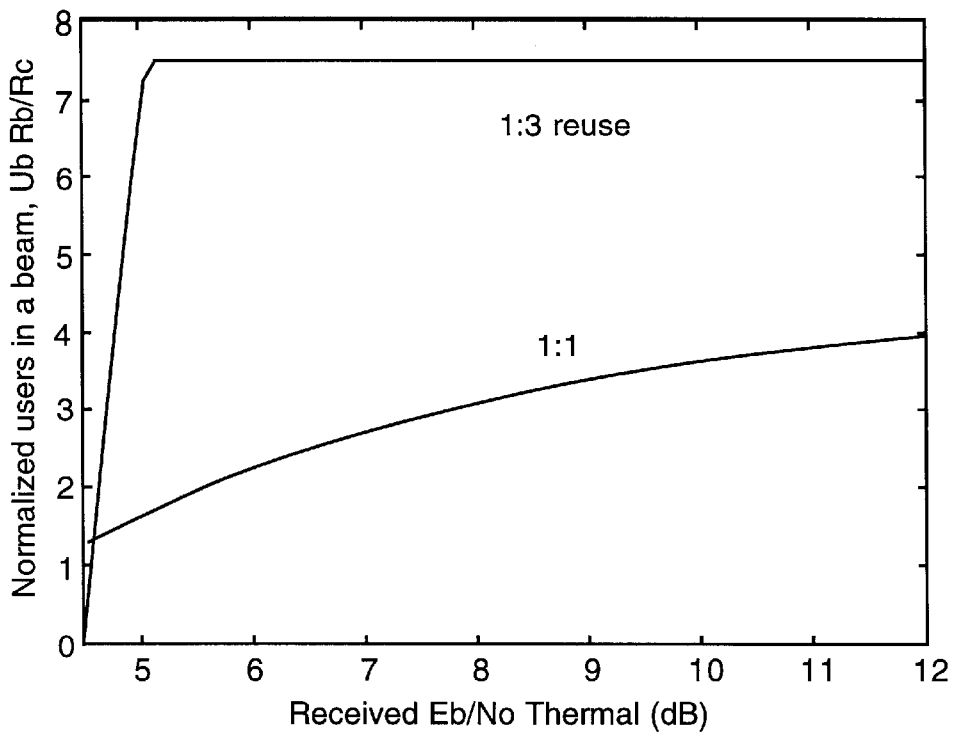
FIG. 5 is a comparison of beam capacities versus Eb/No for 1:1 and 1:3 frequency reuse with the parameters.
Figure 6:
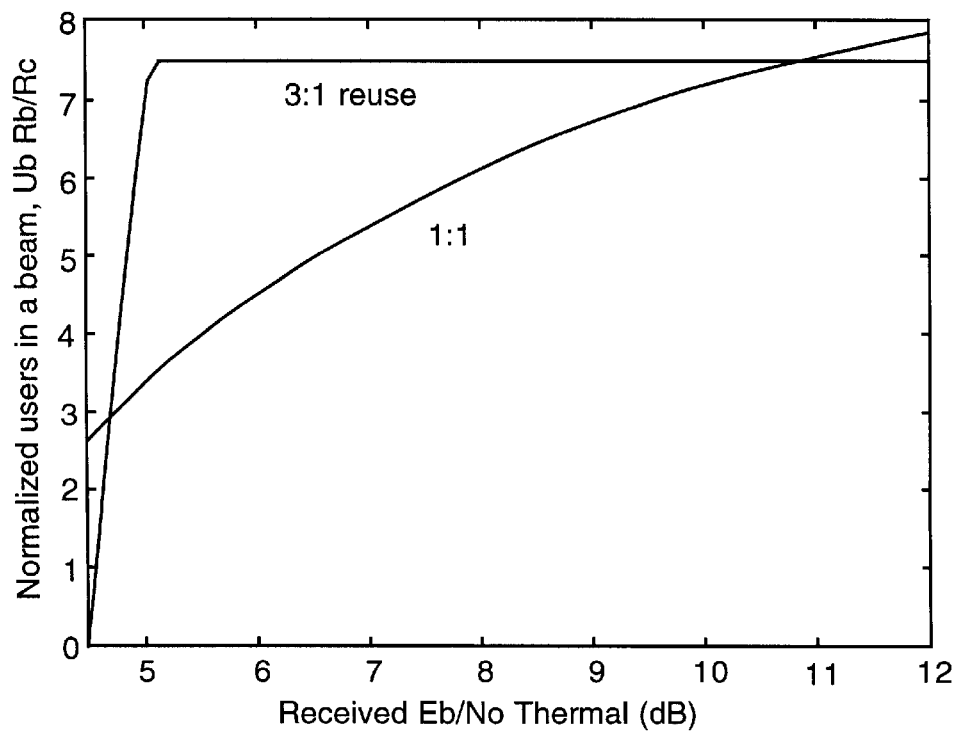
FIG. 6 is a comparison of beam capacities versus $E_b/N_o$ for 1:1 and 1:3 frequency reuse with the parameters.

FIG. 5 is a comparison of beam capacities versus Eb/No for 1:1 and 1:3 frequency reuse with the parameters:

$U_r=1$, $f_1=2.0$, $R_1=0.5$, $C_c(1)=17$, $(E_b/N_o)_{Req'd}$=3 dB, $G_v(1-\eta)F$=1, and $U_r$=3, $f_3$=0.032, $R_3$=0.75, $C_c(3)$=5, $(E_b/N_o)_{Req'd}$=4.5 dB, $G_v(1-\eta)F$=1, respectively, FIG. 6 is a comparison of beam capacities versus $E_b/N_o$ for 1:1 and 1:3 frequency reuse with the parameters:

$U_r$=1, $f_1$=1.0, $R_1$=0.5, $C_c(1)$=17, $(E_b/N_o)_{Req'd}$=3 dB, $G_v(1-\eta)F$=1, and $U_r$=3, $f_3$=0.032, $R_3$=0.75, $C_c(3)$=5, $(E_b/N_o)_{Req'd}$=4.5 dB, $G_v(1-\eta)F$=1, respectively, Thus, the proper choice of frequency reuse to maximize system capacity (while still meeting signal performance requirements) depends on the amount of isolation between satellite antenna beams (or cells in the terrestrial case). Frequency isolation between beams improves the system capacity for a wide range of parameters.

Figure 7:
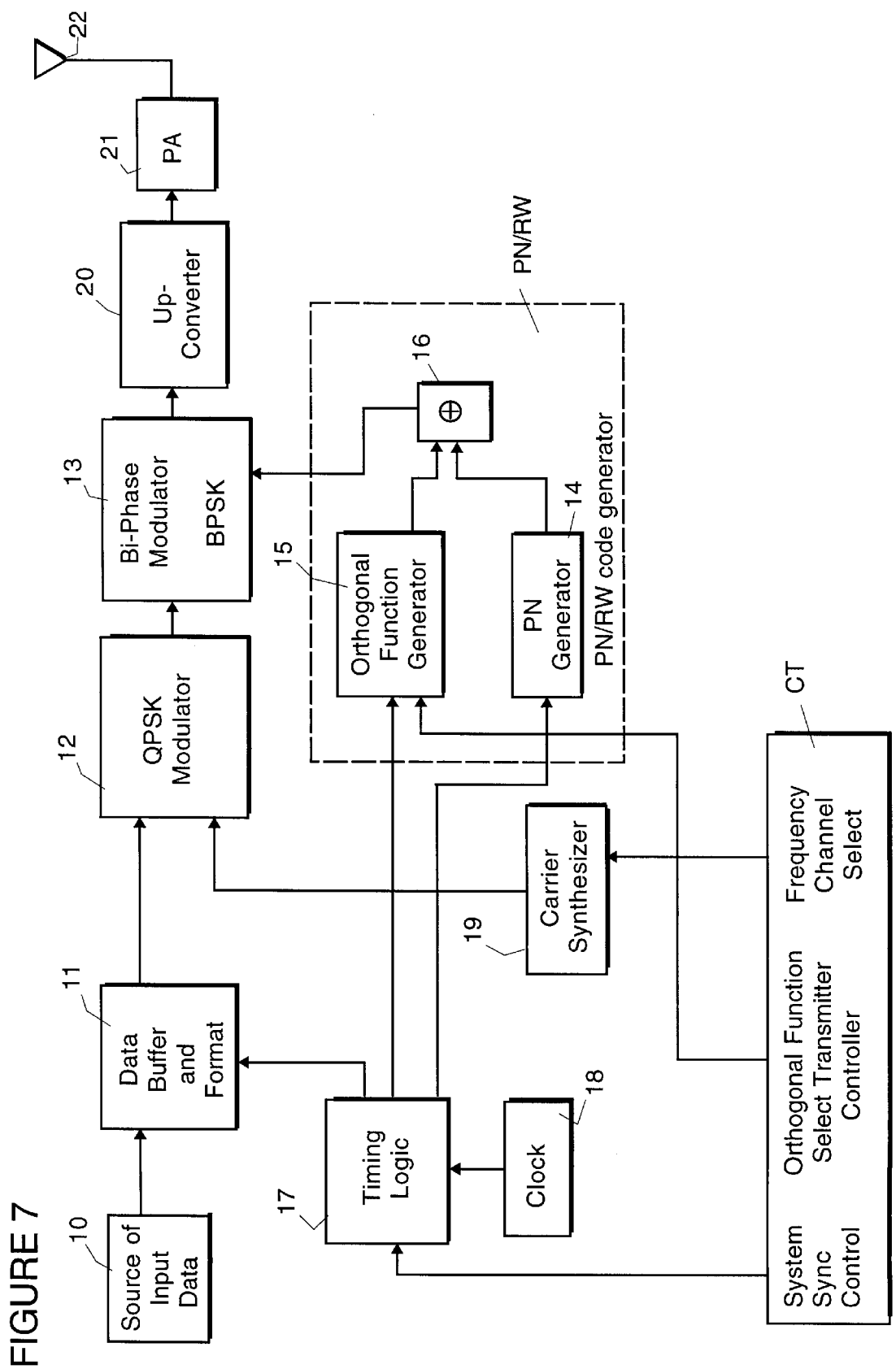
FIG. 7 is a block diagram of a transmitter of an OCDMA communication system used in the invention (and corresponds to FIG. 2 of U.S. Pat. No. 5,668,795)

An embodiment of a transmitter useful in the practice of the invention is shown in FIG. 7. The input data from source 10 is buffered and formatted in 11 and then is modulated on a carrier using MPSK modulation in 12, where M is 4, 8, etc. In the preferred embodiment, one would use M=4, i.e. QPSK modulation. Forward Error Correction (FEC) coding and interleaving may also be employed, depending on the application.

The signal is then BPSK modulated in 13 with a binary sequence which is the Mod-2 sum 16 of a PN sequence from PN generator 14 and one member of a set of binary sequences which are orthogonal over a symbol period. The Radamacher-Walsh (RW) functions in 15, for which there are $2^n$ orthogonal functions of length $2^n$ where n is a positive integer, will be used for illustrative purposes. The RW sequence chip rate must be $2^n$ times the symbol rate so the symbol transitions are synchronized to the RW period to guarantee orthogonality of the multiple users when data transitions are present. An RW function select signal from controller C selects the desired member of the set of RW sequences for Mod-2 summing with the selected PN code.

The same PN code is employed by each of the members of a single "cell" or orthogonal set. The PN clock rate from timing logic circuit 17, which is driven by clock 18, is usually selected to be the same as the RW chip rate, although this is not necessary.

A system synchronizing signal to timing logic circuit 17 and a frequency select signal to conventional carrier synthesizer 19. The signal waveform from BPSK modulator 13 is up-converted 20, power amplified 21 and broadcast by antenna 22.

As mentioned above, each user is assigned a code which is orthogonal to all of the other user codes (i.e. the orthogonal codes have a cross-correlation value of zero with each other). Further, the orthogonal code period is chosen such that the code repeats an integer number of times (usually once) in a data symbol time. The code epoch is synchronized with the symbol transitions so that no data transitions occur within the code. Note that the RW chipping rate is equal to the maximum number of orthogonal users times the symbol rate.

In this embodiment, the modulated carrier frequency is selected from one of N frequencies which are orthogonal over an RW chip interval, i.e. the carrier frequencies are spaced by the RW chipping rate. The composite signal is up-converted to the appropriate frequency band for transmission.

Figure 9:
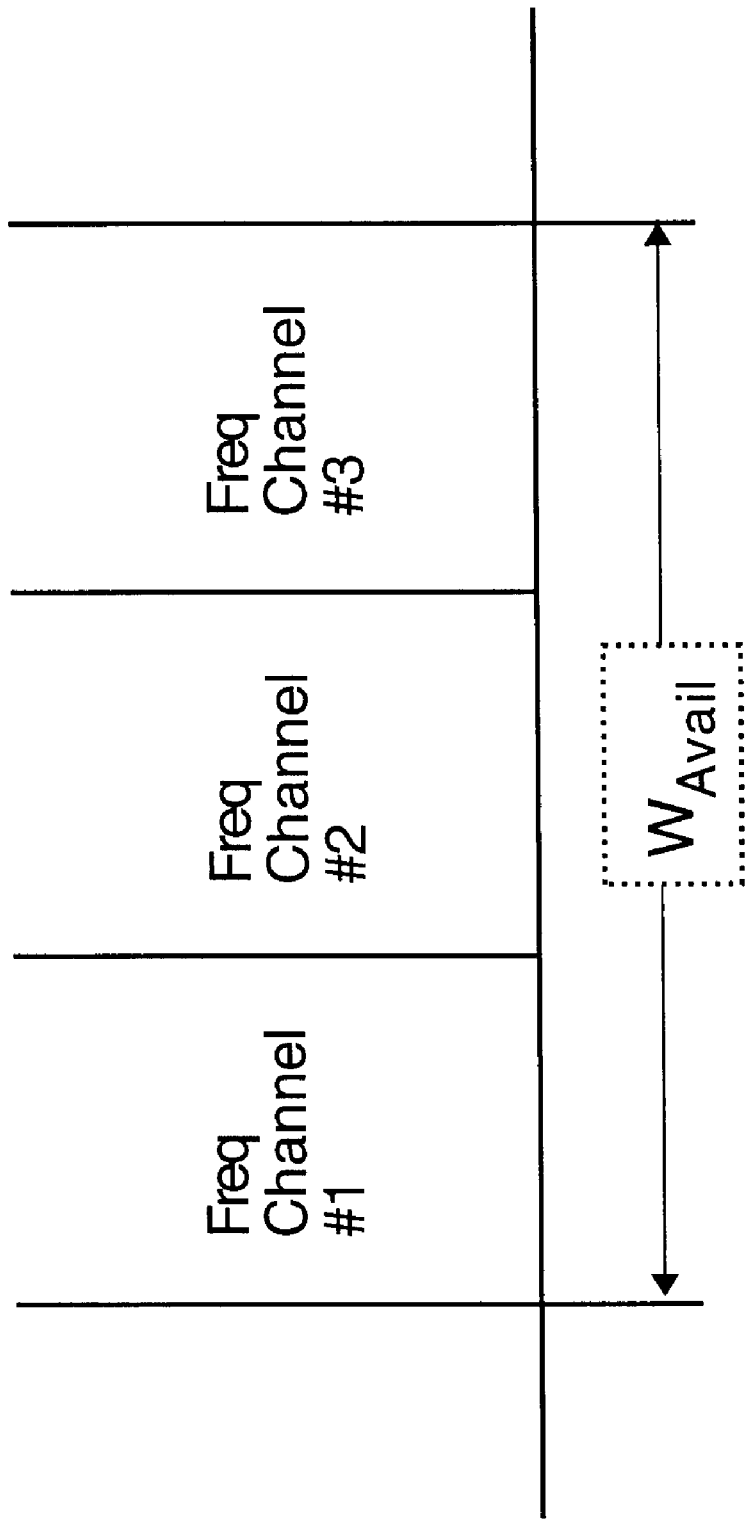
FIG. 9 illustrates an available frequency band divided into three band segments to accommodate 1:3 frequency reuse.

FIG. 9 discloses splitting of the band available in a given area into three band segments to accommodate 1:3 frequency reuse. This is diagrammatically illustrated that the reuse pattern is diagrammatically illustrated in FIG. 4 where the "1" cells correspond to frequency Example No. 1, the "2" cells correspond to frequency channel No. 2, and the "3" cells correspond to frequency channel No. 3. This provides the frequency reuse factor of 1:3 and provides increased frequency isolation and full frequency reuse to give the highest capacity.

The individual transmissions are synchronized to arrive at the base station in time and frequency synchronism. The resulting received spectrum is as shown in FIG. 6 for the case where the chipping rate is 166.4 kHz and five orthogonal carriers are employed.

Figure 8:
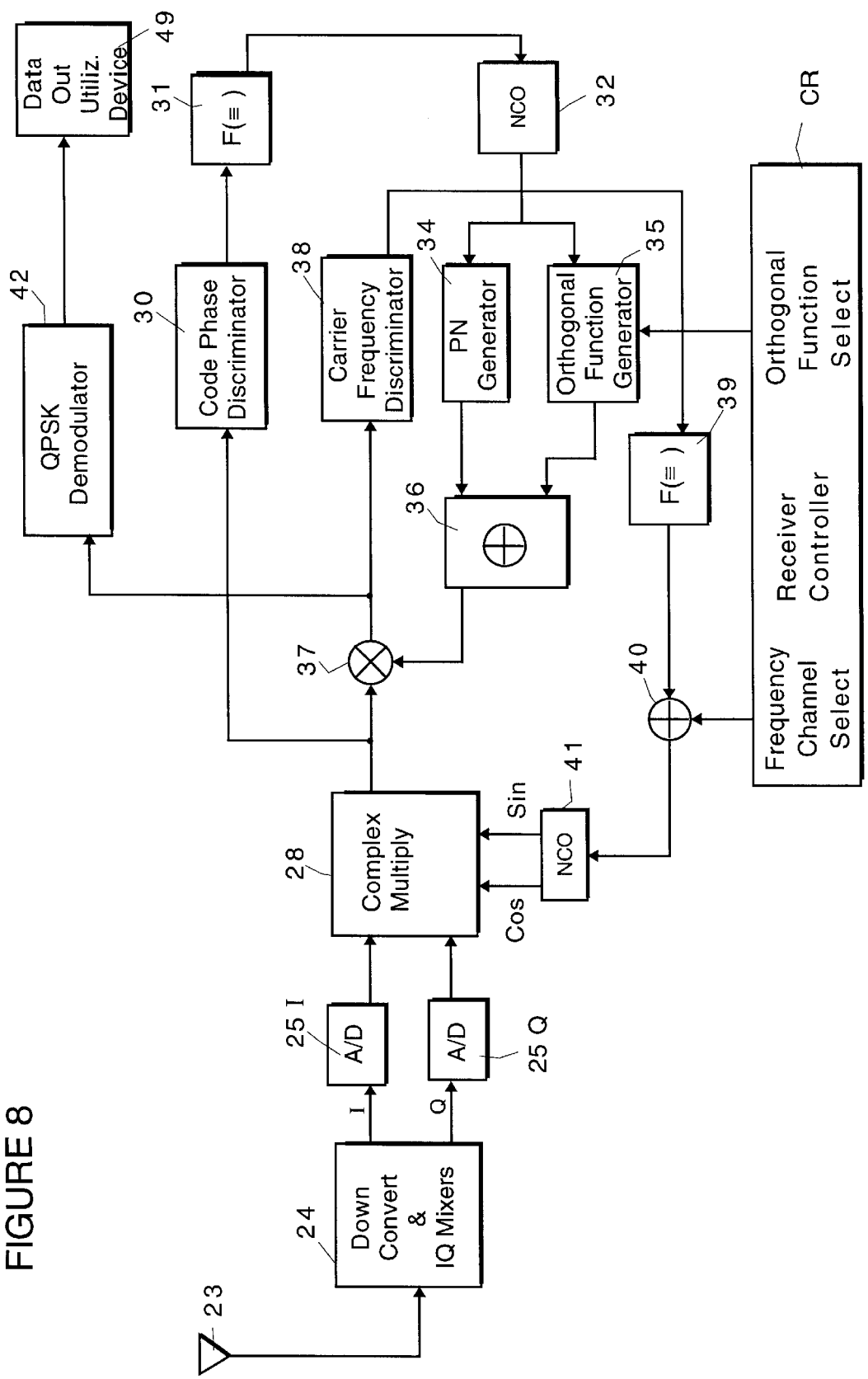
FIG. 8 is a block diagram of a receiver for an OCDMA communication system incorporated in the invention (and corresponds to FIG. 5 of U.S. Pat. No. 5,668,795)

A block diagram of an OCDMA receiver is shown in FIG. 8. The signals received on antenna 23 are down converted 24 to I,Q baseband and converted from analog to digital samples 25I, 25Q for processing. Tracking loops are employed to estimate received carrier frequency and code phase. The code phase tracking loop includes code phase discriminator 30, filter 31, number controlled oscillator 32, which controls PN generator 34 and RW generator 35 which generate the respective PN and RW functions. Receiver controller CR provides an RW select signal to RW generator 35 to select a particular RW function and a PN select signal to PN generator 34 to select a particular PN function. The PN and RW functions are combined 36 and applied to mixer 37. The carrier tracking loop incorporates a carrier frequency discriminator 38, filter 39. The carrier frequency select from receiver controller CR is selected 40, the carrier frequency via number controller oscillator 41. The quadrative (cos, sin) signals from NCO 41 are applied to complex multiplier 28 to close the carrier tracking loop. QPSK demodulation 42 is performed in the usual way employing either coherent or differentially coherent detection to provide the data to a utilization device 43.

While the invention has been described in relation to preferred embodiments of the invention, it will be appreciated that other embodiments, adaptations and modifications of the invention will be apparent to those skilled in the art.

What is claimed is:

1. In a spread spectrum CDMA communication system in which a base station communicates with a multiplicity of subscriber terminals and the signal transmitted by the base station is comprised of a set of substantially orthogonal functions which are overlaid with a pseudo-noise (PN) sequence forming a coded spreading sequence for an information signal, each orthogonal function of said set of substantially orthogonal functions carries data for a single user in said system, a source of selected carrier signals and a modulator to modulate said information signal onto a carrier to form a transmit signal and said coded spreading sequence on said transmit signal for broadcasting, each subscriber terminal has a receiver with a demodulator for coherently demodulating a base station signal and multiple base stations are deployed in a "cellular" coverage structure, the improvement comprising increasing system capacity by dividing an available spectrum into non-overlapping frequency segments which are assigned to different cells in a frequency reuse pattern to provide greater system capacity than full frequency reuse in each cell.

2. The system of claim 1 in which the data intended for each user is voice data.

3. The system of claim 1 which further comprises at least one repeater for receiving the base station signal and translating the signal to a form suitable for an intended recipient user.

4. The OCDMA system of claim 1 in which each base station receives a plurality of spread spectrum signals from a corresponding plurality of subscriber stations on a frequency channel, each signal from a subscriber station being composed of data symbols overlaid with one set of orthogonal functions and a pseudo-noise sequence, said signals from subscriber stations being synchronized to arrive at said base station in time and frequency.

5. In a spread spectrum CDMA communication method in which one or more base stations communicate with a multiplicity of subscriber terminals located in different beams of a multi-beam satellite relay system, said base station(s) transmits a signal for each beam which is comprised of a set of substantially orthogonal functions which are overlaid with a pseudo-noise (PN) sequence forming a coded spreading sequence for an information signal, each orthogonal function of said set of substantially orthogonal functions carries data for a single user in said beam, a source of selected carrier signals and a modulator to modulate said information signal onto a carrier to form a transmit signal and said coded spreading sequence on said transmit signal for broadcasting, each subscriber terminal has a receiver with a demodulator for coherently demodulating the base station signal, the improvement comprising: the steps of dividing an available spectrum into non-overlapping frequency segments and assigning to different cells in a frequency reuse pattern to provide greater system capacity than full frequency reuse in each beam.

6. The system of claim 5 in which the data intended for each user is voice data.

7. The OCDMA system of claim 5 in which each base station receives a plurality of spread spectrum signals from a corresponding plurality of subscriber stations on a frequency channel, each signal from a subscriber station being composed of data symbols overlaid with one set of orthogonal functions and a pseudo-noise sequence which is time shifted or different for adjacent beams, and synchronizing said signals from subscriber stations to arrive at said base station in time and frequency synchronism.

* * * * *